US009469973B2

(12) United States Patent
Imaizumi et al.

(10) Patent No.: US 9,469,973 B2
(45) Date of Patent: Oct. 18, 2016

(54) WHEEL LOADER AND WHEEL LOADER ENGINE CONTROL METHOD

(71) Applicant: KOMATSU LTD., Minato-ku, Tokyo (JP)

(72) Inventors: Masaaki Imaizumi, Mooka (JP); Minoru Wada, Mooka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/416,841

(22) PCT Filed: May 29, 2013

(86) PCT No.: PCT/JP2013/064935

§ 371 (c)(1),
(2) Date: Jan. 23, 2015

(87) PCT Pub. No.: WO2014/017166

PCT Pub. Date: Jan. 30, 2014

(65) Prior Publication Data

US 2015/0204053 A1 Jul. 23, 2015

(30) Foreign Application Priority Data

Jul. 24, 2012 (JP) ................................ 2012-163575

(51) Int. Cl.
*G06F 7/70* (2006.01)
*G06F 19/00* (2011.01)
(Continued)

(52) U.S. Cl.
CPC ............. *E02F 9/2246* (2013.01); *E02F 3/283* (2013.01); *E02F 9/2066* (2013.01); *F02D 29/02* (2013.01);
(Continued)

(58) Field of Classification Search
CPC ........ F02D 29/04; F02D 29/00; F02D 29/02; F02D 41/0085; F02D 2700/07; F02D 2200/10; E02F 9/2246; E02F 9/20; E02F 3/283
USPC ........................................................... 701/50
See application file for complete search history.

(56) References Cited

U.S. PATENT DOCUMENTS

2005/0114002 A1 5/2005 Rodgers
2006/0276948 A1 12/2006 Toda
(Continued)

FOREIGN PATENT DOCUMENTS

JP 2011202531 A 10/2011
JP 2011236759 A 11/2011
(Continued)

OTHER PUBLICATIONS

International Search Report dated Jun. 25, 2013 from corresponding International Patent Application No. PCT/JP2013/064935, including English translation, 2 pages.
(Continued)

*Primary Examiner* — Calvin Cheung
*Assistant Examiner* — Paula L Schneider
(74) *Attorney, Agent, or Firm* — Fish & Richardson P.C.

(57) ABSTRACT

A wheel loader includes detectors and a controller. The detectors include at least an accelerator pedal angle detector that detects an accelerator displacement. The controller includes: a state judging unit that judges from a detection result provided by the detectors whether or not the wheel loader is in an excavation operation; and a torque-curve selector. The torque-curve selector selects one excavation torque curve when the wheel loader is judged to be in the excavation operation by the state judging unit, and selects one of two or more non-excavation torque curves depending on the accelerator displacement when the wheel loader is judged not to be in the excavation operation.

3 Claims, 13 Drawing Sheets

(51) Int. Cl.

| | |
|---|---|
| ***G06G 7/00*** | (2006.01) |
| ***G06G 7/76*** | (2006.01) |
| ***E02F 9/22*** | (2006.01) |
| ***F02D 29/04*** | (2006.01) |
| ***E02F 3/28*** | (2006.01) |
| ***F02D 29/02*** | (2006.01) |
| ***F02D 41/00*** | (2006.01) |
| ***E02F 9/20*** | (2006.01) |

(52) U.S. Cl.
CPC ........... *F02D 29/04* (2013.01); *F02D 41/0085* (2013.01); *F02D 2200/10* (2013.01); *F02D 2700/07* (2013.01)

(56) References Cited

U.S. PATENT DOCUMENTS

2010/0152983 A1* 6/2010 Crowell ................ E02F 9/2066 701/54
2010/0324788 A1 12/2010 Toda
2011/0010058 A1 1/2011 Saito et al.
2011/0231070 A1 9/2011 Toda
2011/0276238 A1 11/2011 Toda
2011/0308878 A1* 12/2011 Shirao ................... B60W 10/06 180/305
2012/0310495 A1 12/2012 Nakanishi et al.
2013/0041561 A1* 2/2013 Asami ................... E02F 9/2246 701/50
2013/0118160 A1 5/2013 Toda

FOREIGN PATENT DOCUMENTS

WO WO2005024208 A1 3/2005
WO WO2009116250 A1 9/2009

OTHER PUBLICATIONS

Extended European Search Report in European Application 13822128.8, dated Feb. 12, 2016, 7 pages.

* cited by examiner

FIG.7B

BUCKET INCLINATION ≦ MINUS 20 DEGREES (INCLINATION FOR DAMPING) — LOADING-IN-PROGRESS FLAG OFF

WHEEL LOADER AND WHEEL LOADER ENGINE CONTROL METHOD

CROSS-REFERENCE TO RELATED APPLICATIONS

This application claims priority to International Application No. PCT/JP2013/064935 filed on May 29, 2013, which application claims priority to Japanese Application No. 2012-163575, filed on Jul. 24, 2012, the contents of which applications are incorporated herein by reference in their entireties.

TECHNICAL FIELD

The present invention relates to a wheel loader and an engine control method for wheel loaders.

BACKGROUND ART

In the latest wheel loaders, an engine torque is automatically switched to save fuel. For instance, a known method for saving fuel includes: judging whether or not a wheel loader is in an excavation operation and whether or not the wheel loader is ascending a hill; setting an engine in a high-power mode when the wheel loader is in the excavation operation or is ascending the hill; and setting the engine in a low-power mode when the wheel loader is neither in the excavation operation nor ascending the hill (see, for instance, Patent Literature 1).

Another known method includes: calculating a load on a working equipment pump and/or a load on a torque converter; and variably adjusting maximum output characteristics (torque curve) of an engine so that a maximum output torque of the engine available with a current engine speed exceeds the calculated load torque (see, for instance, Patent Literature 2).

CITATION LIST

Patent Literature(s)

Patent Literature 1: WO 2005/024208
Patent Literature 2: WO 2009/116250

SUMMARY OF THE INVENTION

Problem(S) to be Solved by the Invention

According to the above methods of Patent Literatures 1 and 2, an operation in progress (e.g., an excavation operation and a loading operation) is determined from the current state and the torque curve of the engine is switched depending on the operation type as determined Only one torque curve should be selectable for one operation type. Therefore, improvement in the fuel-saving performance is limited.

In particular, a large-sized wheel loader intended to be used in mines and the like requires a large power not only during an excavation operation but also during a loading operation where the wheel loader approaches a dump truck while a boom is lifted with a bucket being fully loaded.

A torque curve with a large maximum output torque may be selected for the loading operation so that the wheel loader can approach the dump truck while the boom is lifted at a maximum speed with the bucket being fully loaded. However, in this case, when the bucket is less loaded or a boom-lifting speed is reduced during the operation, the output torque becomes excessive for the workload and thus the fuel-saving performance is lowered.

However, when a low-torque curve is selected for the loading operation to enhance the fuel-saving performance, power is insufficient to lift the boom with the bucket being fully loaded or the boom-lifting speed drops to decrease work efficiency.

An object of the invention is to provide a wheel loader and an engine control method for wheel loaders, capable of enhancing a fuel-saving performance at least during a loading operation and preventing a decrease in work efficiency.

Means for Solving the Problem(s)

According to a first aspect of the invention, a wheel loader includes: an engine; working equipment configured to be driven by the engine; a travel device configured to be driven by the engine; a detector configured to detect a state of the working equipment and a state of the travel device, the detector including at least an accelerator displacement detector configured to detect an accelerator displacement; and a controller configured to store a plurality of torque curves defining different torque characteristics of the engine and to select one of the torque curves for controlling the engine depending on a detection result provided by the detector, the torque curves including one excavation torque curve and two or more non-excavation torque curves, the controller including: a state judging unit configured to judge from the detection result provided by the detector whether or not the wheel loader is in an excavation operation; and a torque-curve selector configured to: select the excavation torque curve when the wheel loader is judged to be in the excavation operation; and select one of the two or more non-excavation torque curves depending on the accelerator displacement detected by the accelerator displacement detector when the wheel loader is judged not to be in the excavation operation.

In the first aspect, when the wheel loader is in the excavation operation, the predetermined torque curve for the excavation operation is selected, thereby controlling the engine in a mode appropriate for the excavation operation. Further, when the wheel loader is in a non-excavation operation such as a loading operation, one of the two or more non-excavation torque curves is selected depending on the accelerator displacement, thereby operating the working equipment at an appropriate speed in accordance with the operation of an operator, and further saving fuel as compared with the case where the non-excavation operation is performed with the excavation torque curve.

According to a second aspect of the invention, a wheel loader includes: an engine; working equipment configured to be driven by the engine; a travel device configured to be driven by the engine; a detector configured to detect a state of the working equipment and a state of the travel device, the detector including at least an accelerator displacement detector configured to detect an accelerator displacement; and a controller configured to store a plurality of torque curves defining different torque characteristics of the engine and to select one of the torque curves for controlling the engine depending on a detection result provided by the detector, the torque curves including one excavation torque curve and two or more non-excavation torque curves, the controller including: a state judging unit configured to judge from the detection result provided by the detector whether or not the wheel loader is in an excavation operation and whether or not the wheel loader is in a loading operation; and a torque-curve selector configured to: select the excavation torque curve when the wheel loader is judged to be in the excavation operation; select one of the two or more non-excavation torque curves depending on the accelerator displacement detected by the accelerator displacement detector when the wheel loader is judged to be in the loading operation; and select another one of the two or more non-excavation torque curves with a smallest obtainable torque curve when the wheel loader is judged to be neither in the excavation operation nor in the loading operation.

In the second aspect, when the wheel loader is in the excavation operation, the predetermined torque curve for the excavation operation is selected, thereby controlling the engine in a mode appropriate for the excavation operation. In contrast, when the wheel loader is in the loading operation, one of the two or more the non-excavation torque curves is selected depending on the accelerator displacement, thereby operating the working equipment at an appropriate speed in accordance with the operation of an operator, and further saving fuel as compared with the case where the loading operation is performed with the excavation torque curve.

According to a third aspect of the invention, the non-excavation torque curves include a non-excavation torque curve to be selected when the accelerator displacement detected by the accelerator displacement detector reaches a maximum level, the non-excavation torque curve defining: torque characteristics identical to torque characteristics of the excavation torque curve in an engine-speed range below an engine speed for the excavation torque curve to have a maximum obtainable torque; and torque characteristics according to which an obtainable torque is small as compared with an obtainable torque in the excavation torque curve at least partially in a range above the engine speed for the excavation torque curve to have the maximum obtainable torque.

In the third aspect, the non-excavation torque curve to be selected when the accelerator displacement reaches the maximum level defines torque characteristics identical to those of the excavation torque curve in the range below the engine speed for the excavation torque curve to provide the maximum torque. In order to approach a dump truck, the wheel loader should be temporarily moved backward after the loading operation and then again moved forward. Even during such an approaching motion, which sometimes requires a relatively low engine speed, fuel can be saved with the speed of the working equipment being ensured.

According to a fourth aspect of the invention, an engine control method for a wheel loader, the wheel loader including: an engine; working equipment configured to be driven by the engine; a travel device configured to be driven by the engine; a detector configured to detect a state of the working equipment and a state of the travel device; and a storage configured to store a plurality of torque curves defining different torque characteristics of the engine, the torque curves including one excavation torque curve and two or more non-excavation torque curves, the method includes: judging from a detection result provided by the detector whether or not the wheel loader is in an excavation operation; selecting the excavation torque curve when the wheel loader is judged to be in the excavation operation; detecting an accelerator displacement when the wheel loader is judged not to be in the excavation operation; and selecting one of the non-excavation torque curves depending on the accelerator displacement.

According to a fifth aspect of the invention, an engine control method for a wheel loader, the wheel loader including: an engine; working equipment configured to be driven by the engine; a travel device configured to be driven by the engine; a detector configured to detect a state of the working equipment and a state of the travel device; and a storage configured to store a plurality of torque curves defining different torque characteristics of the engine, the torque curves including one excavation torque curve and two or more non-excavation torque curves, the method includes: judging from a detection result provided by the detector whether or not the wheel loader is in an excavation operation and whether or not the wheel loader is in a loading operation; selecting the excavation torque curve when the wheel loader is judged to be in the excavation operation; detecting an accelerator displacement when the wheel loader is judged to be in the loading operation; selecting one of the non-excavation torque curves depending on the accelerator displacement; and selecting another one of the two or more non-excavation torque curves with a smallest obtainable torque curve when the wheel loader is judged to be neither in the excavation operation nor in the loading operation.

The fourth aspect can provide the same advantageous effects as those of the first aspect. The fifth aspect can provide the same advantageous effects as those of the second aspect.

BRIEF DESCRIPTION OF DRAWING(S)

FIG. 1 is a side view of a wheel loader according to an exemplary embodiment of the invention.

FIG. 2 schematically illustrates an overall arrangement of the wheel loader of the exemplary embodiment.

FIG. 7B shows setting condition(s) for the loading-in-progress flag according to the exemplary embodiment.

DESCRIPTION OF EMBODIMENT(S)

Exemplary embodiment(s) of the invention will be described below with reference to the attached drawings.

Overall Arrangement

Figure 1:
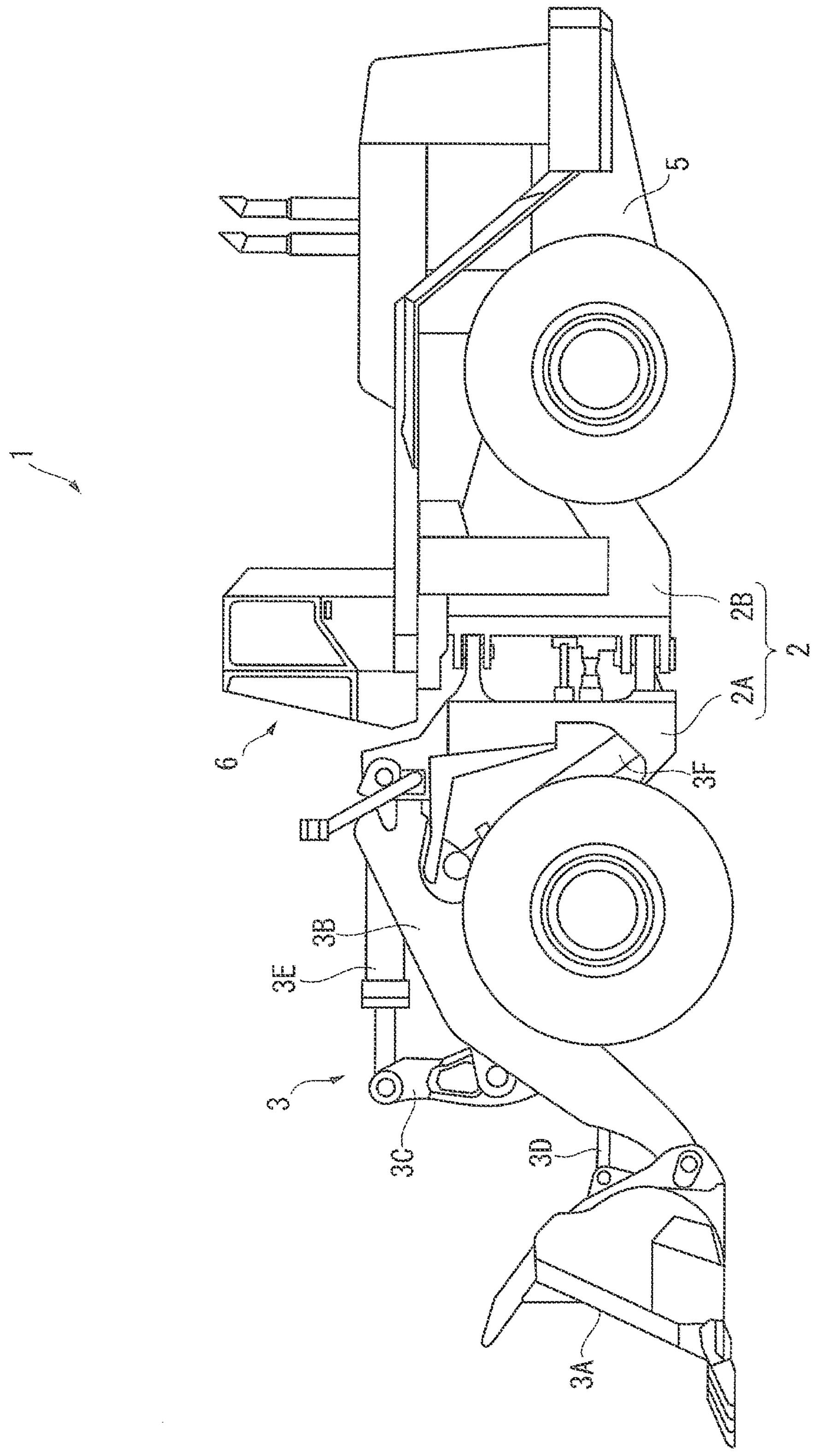

FIG. 1 is a side view of a wheel loader 1 according to a first exemplary embodiment of the invention. The wheel loader 1 is a large-sized wheel loader 1 intended to be used in mines and the like.

The wheel loader 1 includes a vehicle body 2 including a front vehicle body 2A and a rear vehicle body 2B. The front vehicle body 2A has a front side (the left side in FIG. 1) provided with hydraulic working equipment 3 including an excavating/loading bucket 3A, a boom 3B, a bell crank 3C, a connecting link 3D, a bucket cylinder 3E and a boom cylinder 3F.

The rear vehicle body 2B includes a rear vehicle body frame 5 formed from a thick metal plate or the like. The rear vehicle body frame 5 has a front side provided with a box-shaped cab 6 in which an operator is to be seated and a rear side where, for instance, an engine (not shown) and a hydraulic pump configured to be driven by the engine are mounted.

Figure 2:
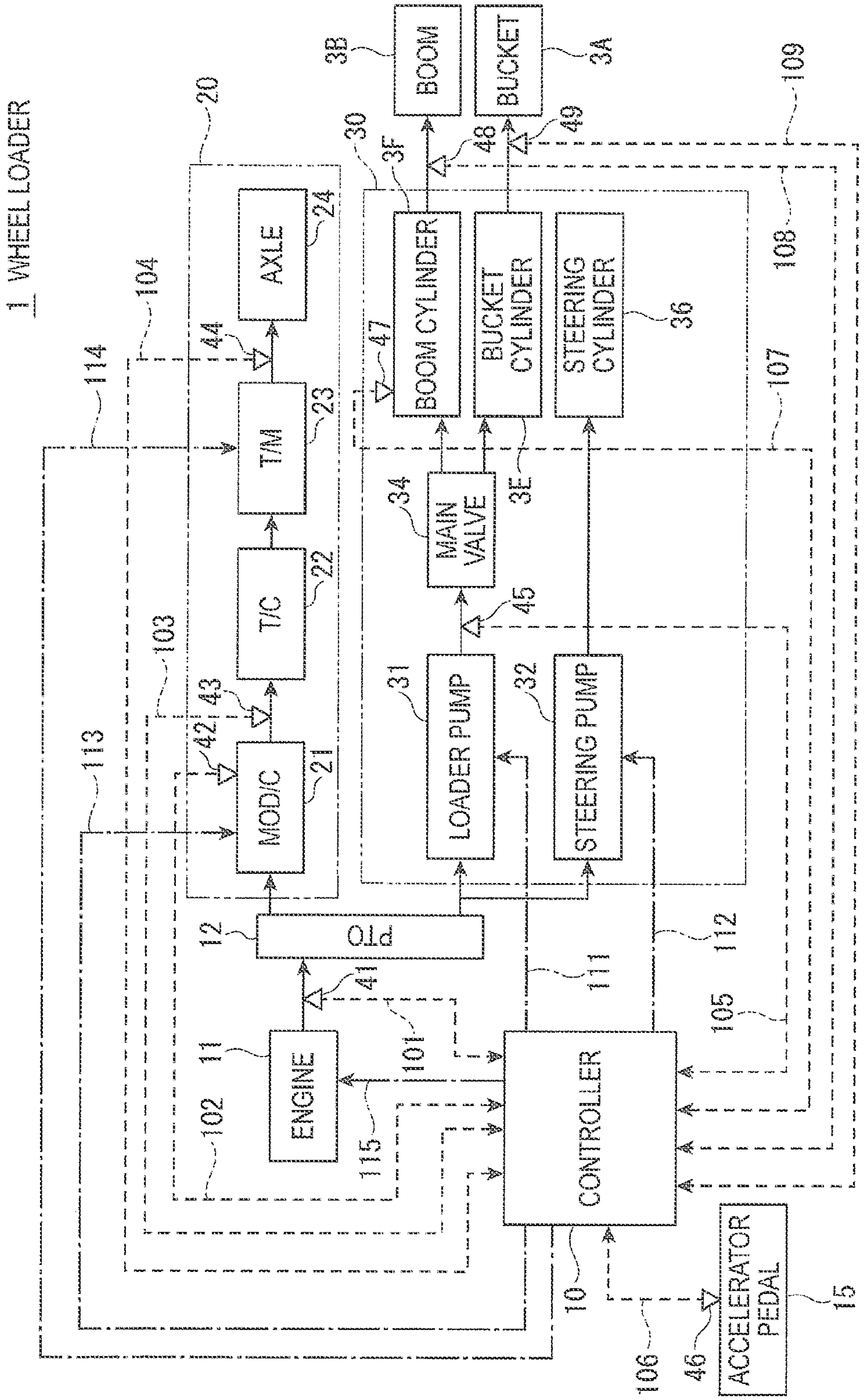

FIG. 2 schematically illustrates an overall arrangement of the wheel loader 1. The wheel loader 1 includes a controller 10, an engine 11, a PTO (Power Take Off unit) 12, a travel system 20 and a hydraulic system 30.

The PTO 12 distributes an output from the engine 11 to the travel system 20 and the hydraulic system 30. The travel system 20 is a mechanism (traveling unit) for allowing the wheel loader 1 to travel and the hydraulic system 30 is a mechanism for driving mainly the working equipment 3 (e.g., the boom 3B and the bucket 3A).

The travel system 20 includes, for instance, a modulation clutch (hereinafter referred to as "clutch") 21, a torque converter 22, a transmission 23 and an axle 24. Incidentally, the clutch, the torque converter and the transmission are respectively abbreviated as "MOD/C", "T/C" and "T/M" in FIG. 2.

For instance, the clutch 21 is hydraulically connected and disconnected. Specifically, when the controller 10 sends a clutch command pressure in the form of a control signal specifying a hydraulic pressure for the clutch 21, the clutch 21 is controlled with the specified hydraulic pressure. The pressure for the clutch 21 is hereinafter referred to as "clutch pressure".

A power outputted from the engine 11 is transmitted to wheels through the clutch 21, the torque converter 22, the transmission 23 and the axle 24.

The hydraulic system 30 includes, for instance, a loader pump 31, a steering pump 32, a main valve 34, a boom cylinder 3F, a bucket cylinder 3E and a steering cylinder 36.

The loader pump 31 is a pump for feeding a hydraulic oil to the boom cylinder 3F and the bucket cylinder 3E. The steering pump 32 is a pump for feeding a hydraulic oil to the steering cylinder 36.

Each of the loader pump 31 and the steering pump 32 is, for instance, a hydraulic pump with a swash plate, the inclination of which is adjusted with a control signal from the controller 10.

In response to a pilot pressure inputted with a bucket lever or a boom lever, the main valve 34 supplies a hydraulic oil discharged from the loader pump 31 to the boom cylinder 3F or the bucket cylinder 3E.

The hydraulic system 30 may further include a different pump in place of at least one of the loader pump 31 and the steering pump 32 or in addition to these pumps. For instance, the wheel loader 1 may further include a pump for driving a cooling fan, a pump for lubricating the transmission 23 and/or a pump for generating a brake pressure.

The wheel loader 1 includes a variety of sensors such as an engine speed sensor 41 that detects an engine speed, a clutch pressure sensor 42 that detects the clutch pressure, a clutch output shaft speed sensor 43 that detects the rotation speed of the output shaft of the clutch 21, a T/M output speed sensor 44 that detects the rotation speed of the output shaft of the transmission 23, a loader pump hydraulic sensor 45 that detects a loader pump hydraulic pressure, and an accelerator pedal angle detector (accelerator pedal angle sensor) 46 that detects the displacement of the accelerator pedal 15 (hereinafter referred to as "accelerator pedal angle"). It should be noted that the accelerator pedal angle detector 46 serves as an accelerator displacement detector according to the invention.

Detectors

Figure 3:
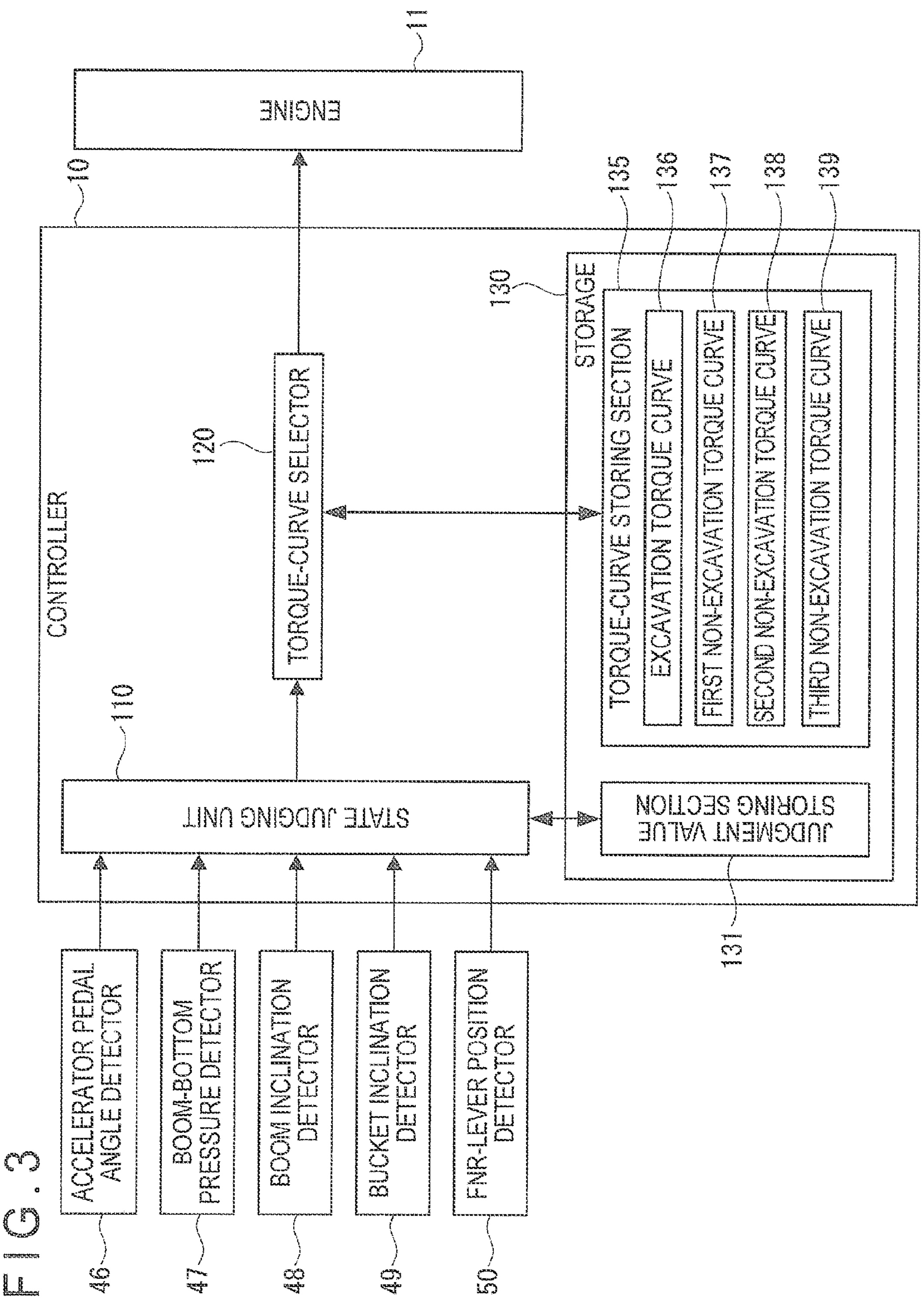
FIG. 3 is a block diagram showing an arrangement of a controller according to the exemplary embodiment.

Further, in the exemplary embodiment, as shown in FIGS. 2 and 3, a boom-bottom pressure detector 47, a boom inclination detector 48, a bucket inclination detector 49, and an FNR-lever position detector 50 are also provided in addition to the accelerator pedal angle detector 46. These detectors serve as a detector according to the invention.

The boom-bottom pressure detector 47 includes a pressure sensor provided to the bottom of the boom cylinder 3F to detect a boom-bottom pressure.

The boom inclination detector 48, which is a device for detecting an inclination of the boom 3B relative to a ground surface, includes a potentiometer or the like provided to a pivot of the boom 3B to detect the inclination of the boom 3B.

The bucket inclination detector 49, which is a device for detecting an inclination of the bucket 3A relative to the ground surface, includes a potentiometer or the like provided to a pivot of the bell crank 3C to indirectly detect the inclination of the bucket 3A. Incidentally, the bucket inclination detector 49 may include a potentiometer or the like provided to a pivot of the bucket 3A to indirectly detect the inclination of the bucket 3A based on an interrelation with the boom inclination.

The FNR-lever position detector 50 detects the position of an FNR lever, which is shifted to select one of the gears of the transmission 23 such as a forward gear (F), a neutral gear (N) and a reverse gear (R). For instance, when the transmission 23 has first to fourth forward gears (F1 to F4), first and second reverse gears (R1, R2), and a neutral gear (N), the FNR-lever position detector 50 detects one selected from among these gears by shifting the FNR lever.

The states detected by the sensors 41 to 45 and the detectors 46 to 50 are inputted as electric signals into the controller 10 as respectively shown by dotted-line arrows 101 to 109.

The controller 10 is also configured to: send to the loader pump 31 a control signal specifying a swash plate inclination of the loader pump 31 as shown by a chain-line arrow 111; send to the steering pump 32 a control signal specifying a swash plate inclination of the steering pump 32 as shown by a chain-line arrow 112; send to the clutch 21 the clutch command pressure as shown by a chain line 113; send to the transmission 23 a control signal specifying a gear as shown by a chain line 114; and send to the engine 11 a fuel injection amount signal corresponding to the accelerator pedal angle according to the later-described torque curve (maximum output characteristics) as shown by a chain line 115.

Arrangement of Controller

An arrangement of the controller 10 will be described with reference to FIG. 3.

The controller 10 includes a state judging unit 110, a torque-curve selector 120 and a storage 130.

The state judging unit 110 judges whether or not the wheel loader 1 is in an excavation operation depending on detection results outputted from the detectors 46 to 50, and further judges whether or not the wheel loader 1 is in a loading operation when the wheel loader 1 is not in the excavation operation. A specific method for the above state judgment will be described later.

The torque-curve selector 120 selects a torque curve corresponding to the state judged by the state judging unit 110.

The storage 130 includes a judgment value storing section 131 and a torque-curve storing section 135.

The judgment value storing section 131 stores a judgment value of the boom inclination and a judgment value of the boom-bottom pressure as shown in Table 1 below, these judgment values being used by the state judging unit 110. Incidentally, although the respective preset values of three boom-bottom pressure judgment values 1 to 3 are the same in Table 1, the respective preset values may be different depending on, for instance, the type of the wheel loader 1.

TABLE 1

| Name of Variable | Preset Value |
|---|---|
| Boom Inclination Judgment Value 1 | −43.0 deg |
| Boom Inclination Judgment Value 2 | −17.0 deg |
| Boom-bottom Pressure Judgment Value 1 | 13 Mpa |
| Boom-bottom Pressure Judgment Value 2 | 13 Mpa |
| Boom-bottom Pressure Judgment Value 3 | 13 Mpa |

The torque-curve storing section 135 stores one excavation torque curve 136 and three non-excavation torque curves 137 to 139.

Figure 4:
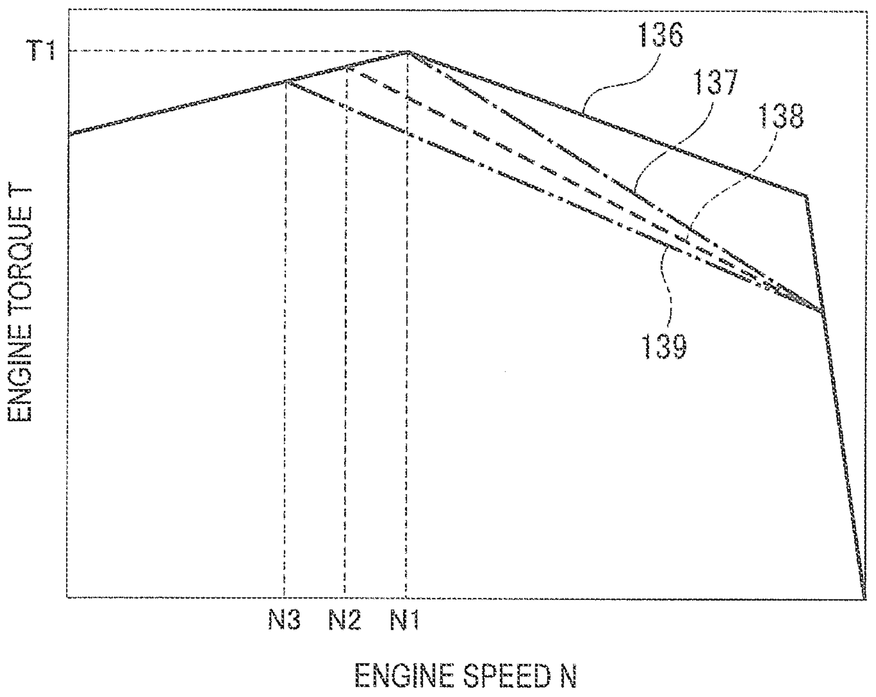
FIG. 4 shows an example of a torque curve according to the exemplary embodiment.

The torque curves 136 to 139 have characteristics, for instance, as shown in FIG. 4. FIG. 4 illustrates engine performances, which are defined in terms of a maximum engine output torque T at each engine speed N, in the form of the torque curves 136 to 136.

The excavation torque curve 136 is intended to give priority to power over fuel saving and an obtainable maximum output torque T1 thereof is the highest among those of all the torque curves 136 to 139.

The first non-excavation torque curve 137 shows: a maximum output torque identical to that of the excavation torque curve 136 as long as the engine speed N falls within a range equal to or below an engine speed N1 for the excavation torque curve 136 to have the maximum torque; and an output torque smaller than that of the excavation torque curve 136 in a range above the engine speed N1.

The second non-excavation torque curve 138 shows: a maximum output torque identical to those of the excavation torque curve 136 and the non-excavation torque curve 137 as long as the engine speed N falls within a range equal to or below an engine speed N2 lower than N1; and an output torque smaller than that of the non-excavation torque curve 137 in a range above the engine speed N2.

The third non-excavation torque curve 139 shows: a maximum output torque identical to those of the excavation torque curve 136 and the non-excavation torque curves 137, 138 as long as the engine speed N falls within a range equal to or below an engine speed N3 lower than N2; and an output torque smaller than that of the second non-excavation torque curve 138 in a range above the engine speed N3

The torque-curve selector 120 selects one of the torque curves 136 to 139 stored in the torque-curve storing section 135 based on the judgment result of the state judging unit 110. The controller 10 then sends to the engine 11 the fuel injection amount signal corresponding to the accelerator pedal angle detected by the accelerator pedal angle detector 46 according to the torque curve selected by the torque-curve selector 120, as described above.

State Judging Process

Next, a state judging process performed by the state judging unit 110 will be described with reference to FIGS. 5A to 7.

The state judging unit 110 sets ON/OFF of a boom-bottom pressure decrease flag, an excavation-in-progress flag and a loading-in-progress flag based on the detection results outputted from the detectors 46 to 50.

Conditions for Setting Boom-Bottom Pressure Decrease Flag on

Figure 5A:
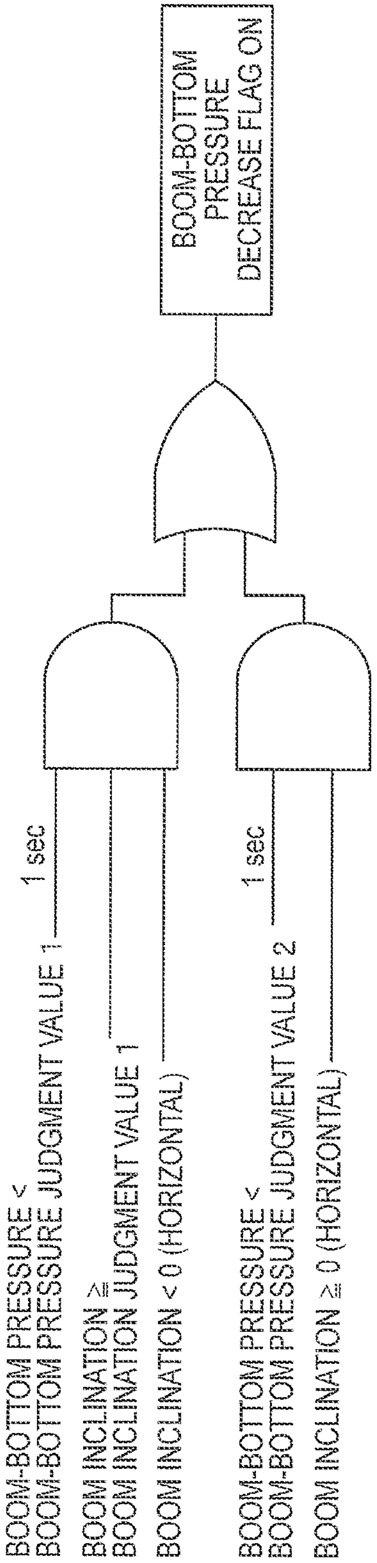
FIG. 5A shows setting condition(s) for a boom-bottom pressure decrease flag according to the exemplary embodiment.

As shown in FIG. 5A, the state judging unit 110 sets the boom-bottom pressure decrease flag ON when: the boom inclination is less than zero but more than the boom inclination judgment value 1; and the boom-bottom pressure stays below the boom-bottom pressure judgment value 1 for one second or more.

The state judging unit 110 also sets the boom-bottom pressure decrease flag ON when: the boom inclination is zero or more; and the boom-bottom pressure stays below the boom-bottom pressure judgment value 2 for one second or more.

Whether or not the boom-bottom pressure decreases is an important factor for judging whether or not excavation is in progress.

Therefore, when judging that the boom-bottom pressure decreases based on the detection of whether or not the boom-bottom pressure is less than the judgment value, the state judging unit 110 sets the boom-bottom pressure decrease flag ON. It should be noted that, as shown in FIG. 5A, a judging process for a boom inclination of a horizontal level (zero) or more is different from a judging process for a boom inclination less than the horizontal level (zero) but not less than a lower limit (the boom inclination judgment value 1) at which the bucket 3A is in contact with the ground. With the above arrangement, it is possible to differently preset the boom-bottom judgment values for the boom inclination of the horizontal level or more and for the boom inclination below the horizontal level, thereby enhancing judgment accuracy.

Particularly, the boom-bottom pressure of a middle- or small-sized wheel loader less varies depending on whether the loader is in an excavation operation or in an non-excavation operation (e.g., a loading operation). Accordingly, judgment accuracy can be enhanced by presetting different boom-bottom judgment values.

Figure 5B:
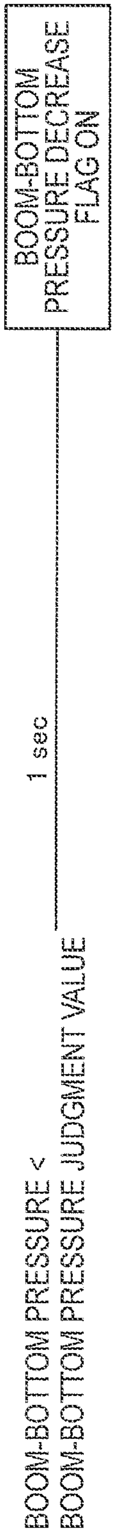
FIG. 5B shows setting condition(s) for the boom-bottom pressure decrease flag according to the exemplary embodiment.

In contrast, in a large-sized wheel loader usable in mines and the like, as shown in FIG. 5B, the state judging unit 110 may set the boom-bottom pressure decrease flag ON when the boom-bottom pressure stays below the boom-bottom pressure judgment value for one second or more.

The boom-bottom pressure of a large-sized wheel loader considerably varies depending on whether or not the loader is in an excavation operation, so that it is not necessary to preset different boom-bottom judgment values depending on boom inclinations. Therefore, the state judging unit 110 can set the boom-bottom pressure decrease flag ON by merely comparing the detected boom-bottom pressure with a boom-bottom pressure judgment value preset at an intermediate value between a boom-bottom pressure during the excavation operation and a boom-bottom pressure during the non-excavation operation.

Conditions for Setting Boom-Bottom Pressure Decrease Flag OFF

Figure 5C:
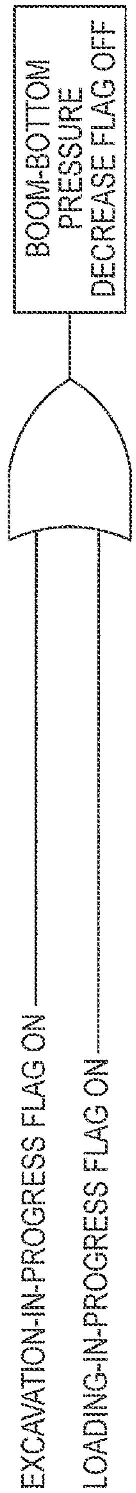
FIG. 5C shows setting condition(s) for the boom-bottom pressure decrease flag according to the exemplary embodiment.

As shown in FIG. 5C, the state judging unit 110 sets the boom-bottom pressure decrease flag OFF when the excavation-in-progress flag (described later) is ON, or when the loading-in-progress flag (described later) is ON.

Conditions for Setting Excavation-in-Progress Flag ON

Figure 6A:
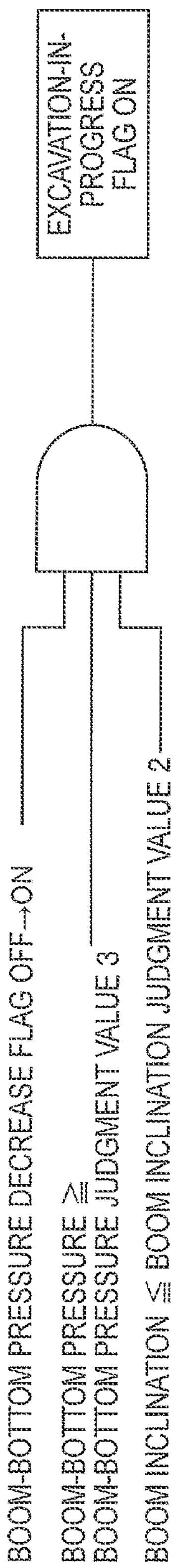
FIG. 6A shows setting condition(s) for an excavation-in-progress flag according to the exemplary embodiment.

As shown in FIG. 6A, the state judging unit 110 sets the excavation-in-progress flag ON when: the boom-bottom pressure decrease flag is turned ON from OFF; the boom-bottom pressure is equal to or more than the boom-bottom pressure judgment value 3; and the boom inclination is equal to or less than the boom inclination judgment value 2.

As long as the boom inclination is equal to or less than the boom inclination judgment value 2, the bucket 3A is supposed to reach a level appropriate for the excavation operation. As long as the boom-bottom pressure decrease flag is turned ON from OFF and the boom-bottom pressure is equal to or more than the boom-bottom pressure judgment value 3, the boom-bottom pressure is supposed to increase during the excavation operation. Accordingly, the state judging unit 110 sets the excavation-in-progress flag ON when the conditions shown in FIG. 6A are satisfied.

Conditions for Setting Excavation-in-Progress Flag OFF

Figure 6B:
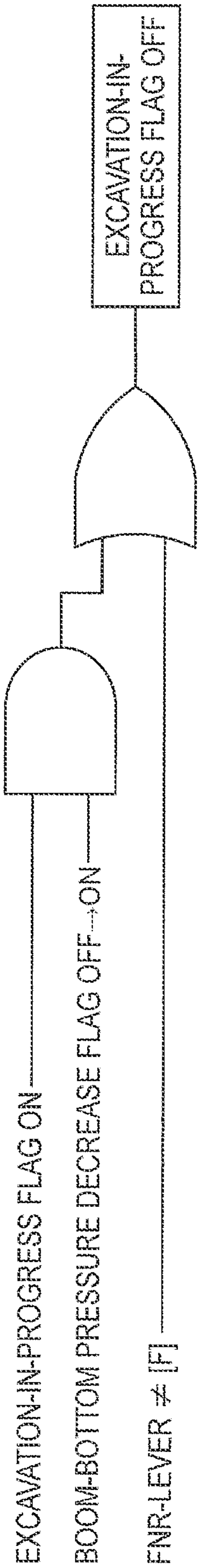
FIG. 6B shows setting condition(s) for the excavation-in-progress flag according to the exemplary embodiment.

As shown in FIG. 6B, the state judging unit 110 sets the excavation-in-progress flag OFF when the boom-bottom pressure decrease flag is turned ON from OFF while the excavation-in-progress flag is ON or when the FNR lever is shifted to any position other than F (forward), i.e., N (neutral) or R (reverse).

When the boom-bottom pressure decrease flag is turned ON while the excavation-in-progress flag is ON (i.e., an excavation state), it is determined that excavation state is canceled. Similarly, since the excavation operation is always performed in a Forward (F) state, the excavation state is also supposed to be canceled when any gear other than the forward gear (F) is selected.

Conditions for Setting Loading-in-Progress Flag ON

As shown in 7A, the state judging unit 110 sets the loading-in-progress flag ON when the excavation-in-progress flag is turned ON from OFF. Since the loading operation is performed after the excavation operation, the state judging unit 110 sets the loading-in-progress flag ON when the excavation-in-progress flag is turned OFF.

Conditions for Setting Loading-in-Progress Flag OFF

Figure 7A:
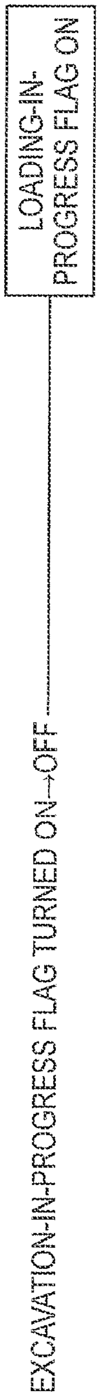
FIG. 7A shows setting condition(s) for a loading-in-progress flag according to the exemplary embodiment.

As shown in FIG. 7B, the state judging unit 110 sets the loading-in-progress flag OFF when the bucket inclination detected by the bucket inclination detector 49 is a damping inclination (e.g., minus 20 degree or less).

The loading operation is supposed to be completed when the wheel loader 1 approaches a dump truck to dump the earth. In order to dump the earth, the bucket lever is shifted toward a dumping side, thereby setting the inclination of the bucket 3A negative (minus) to bring the bucket 3A into a damping posture. Accordingly, completion of the loading operation can be detected by judging whether or not the bucket inclination is equal to or less than a predetermined inclination.

Torque Curve Selecting Process

Figure 8:
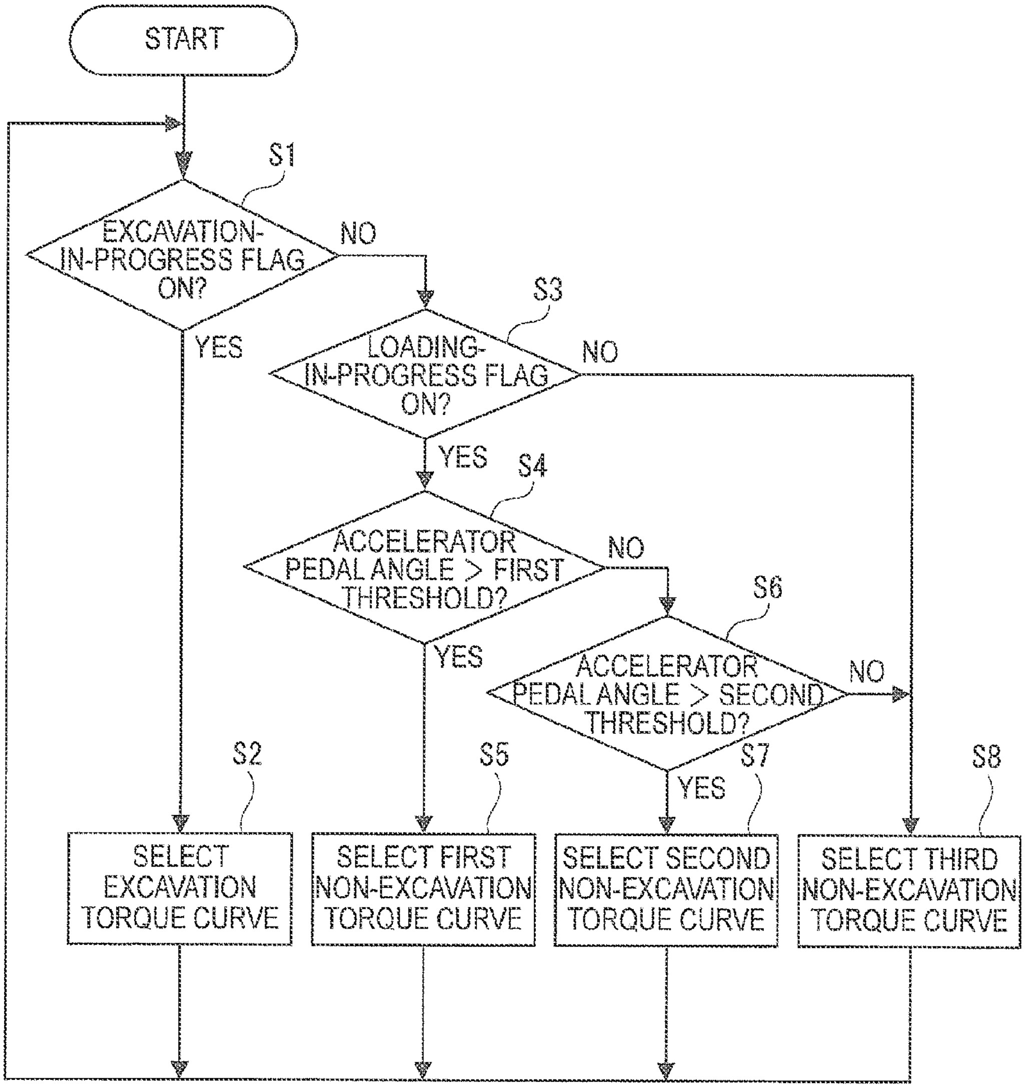
FIG. 8 shows a flow chart of a torque curve selecting process according to the exemplary embodiment.

Next, a torque curve selecting process performed by the torque-curve selector 120 will be described with reference to FIG. 8.

The torque-curve selector 120 selects one of the torque curves depending on ON/OFF of the flags set by the state judging unit 110.

Specifically, the torque-curve selector 120 judges whether or not the excavation-in-progress flag is ON (step S1). When the excavation-in-progress flag is ON (step S1: Yes), the torque-curve selector 120 selects the excavation torque curve 136 (step S2). As a result, the output torque of the engine 11 can be increased, thereby operating the working equipment 3 or the like in an appropriate state for the excavation operation.

When the judgment result is No in step S1, the torque-curve selector 120 judges whether or not the loading-in-progress flag is ON (step S3). When the loading-in-progress flag is ON (step S3: Yes), the torque-curve selector 120 judges whether or not the accelerator pedal angle detected by the accelerator pedal angle detector 46 exceeds a first threshold (90% in the exemplary embodiment) (step S4).

When the accelerator pedal angle exceeds the first threshold (step S4: Yes), the torque-curve selector 120 selects the first non-excavation torque curve 137 (step S5). The output torque of the engine 11 could be reduced during the loading operation as compared with the excavation operation. However, since an operator increases the accelerator pedal angle (a pressing amount), the wheel loader 1 has to approach a dump truck at an increased speed while being fully loaded and/or the speed of the working equipment 3 (e.g., the lifting speed of the boom 3B) has to be increased. Accordingly, the first non-excavation torque curve 137 is selected due to the highest output torque thereof among those of the non-excavation torque curves 137 to 139, thereby increasing the speed of the working equipment 3 or the like during the loading operation and saving the fuel as compared with the case where the engine 11 is controlled according to the excavation torque curve 136 during the loading operation.

When the judgment result is No in step S4 (i.e., the accelerator pedal angle is less than the first threshold), the torque-curve selector 120 judges whether or not the accelerator pedal angle exceeds a second threshold (80% in the exemplary embodiment) (step S6).

When the accelerator pedal angle is less than the first threshold but more than the second threshold (step S6: Yes), the torque-curve selector 120 selects the second non-excavation torque curve 138 (step S7).

In this case, since the operator slightly reduces the accelerator pedal angle (the pressing amount), the fuel can be saved while the speed of the working equipment 3 or the like is reduced during the loading operation as compared with the case where the engine 11 is controlled according to the excavation torque curve 136 or the first non-excavation torque curve 137.

When the judgment result is No in step S6 (i.e., the accelerator pedal angle is less than the second threshold) or when the judgment result is No in step S3 (i.e., the wheel loader 1 is neither in the excavation operation nor in the loading operation, but may merely travel), the torque-curve selector 120 selects the third non-excavation torque curve 139 (step S8).

In this case, while the output torque is reduced, the fuel can be further saved as compared with the case where the engine 11 is controlled according to the excavation torque curve 136, the first non-excavation torque curve 137 or the second non-excavation torque curve 138. Accordingly, when it is not necessary to considerably increase the speed of the working equipment 3 during the loading operation due to a cycle time of the operation, the operation may be performed, with priority given to fuel saving.

Similarly, the engine 11 may be controlled, with priority given to fuel saving, for instance, when the wheel loader 1 merely travels without any load for instance, after the loading operation or before the excavation operation and thus the output torque for the working equipment 3 or the like does not need to be increased. Further, when the wheel loader 1 is neither in the excavation operation nor in the loading operation, the torque curve is not selected depending on the accelerator angle. Therefore, the torque curve is unchanged as long as the wheel loader 1 merely travels, so that the speed can be smoothly adjusted depending on the accelerator pedal angle.

The non-excavation torque curves 137 to 139 each have characteristics identical to those of the excavation torque curve 136 as long as the engine speed N is in a low-speed range. Therefore, when the wheel loader 1 is in an operation with the engine speed N being low (e.g., when the wheel loader 1 temporarily moves backward after the excavation operation and then again moves forward to approach a dump truck to load the dump truck), the output torque of the engine 11 can be ensured to prevent work efficiency from being lowered.

Incidentally, it should be understood that the scope of the invention is not limited to the above-described exemplary embodiment(s), but includes modifications and improvements as long as the modifications and improvements are compatible with the invention.

Figure 9:
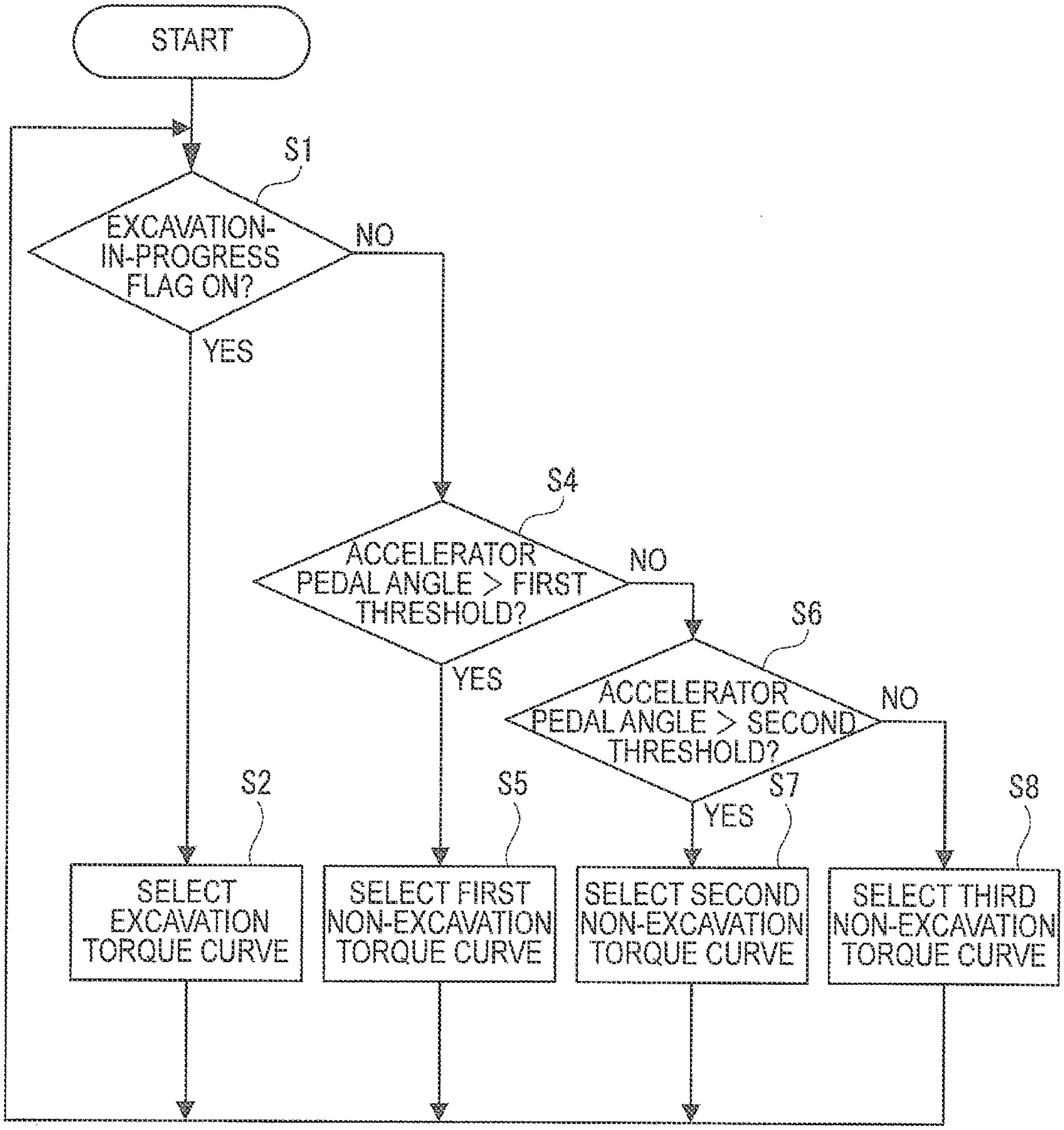
FIG. 9 shows a flow chart of a torque curve selecting process according to a modification of the invention.

For instance, as shown in a flow chart of FIG. 9, step S3 of the exemplary embodiment may be omitted from the judging process, and one of the three non-excavation torque curves 137 to 139 may be selected depending on the accelerator pedal angle when the excavation-in-progress flag is OFF (i.e., the wheel loader 1 is not in the excavation operation). In other words, when the wheel loader 1 merely travels, one of the torque curves 137 to 139 may be selected depending on the accelerator pedal angle in the same manner as when the wheel loader 1 is in the loading operation. In this case, it is not necessary to judge whether or not the wheel loader 1 is in the loading operation.

Further, when the wheel loader 1 is not in the excavation operation, the varieties and number of torque curves to be selected may be different depending on whether the wheel loader 1 is in the loading operation or merely travels. For instance, while one of the three torque curves 137 to 139 may be selected depending on the accelerator pedal angle when the wheel loader 1 is in the loading operation, one of the two torque curves 138 and 139 may be selected when the wheel loader 1 is not in the loading operation.

The respective characteristics of the torque curves 136 to 139 may be entirely or partially shown in the form of a curve in place of a polygonal line as exemplarily shown in FIG. 4.

Further, although having the identical torque characteristics as long as the engine speed N is in the low-speed range, the torque curves 136 to 139 may have different torque characteristics even in this range. Specifically, while the excavation torque curve 136 may be determined to give priority to power over fuel saving, the first non-excavation torque curve 137, second non-excavation torque curve 138 and third non-excavation torque curve 139 may be designed to gradually save more fuel in this order.

Additionally, there may be two non-excavation torque curves or four or more non-excavation torque curves in place of the three non-excavation torque curves.

Any detector may be used as each of the detectors 46 to 50 as long as the detector is capable of judging whether or not the wheel loader 1 is in the excavation operation or in the loading operation. For instance, a detector capable of detecting a difference in rotation between an input side and output side of the torque converter 22 may be used.

In the exemplary embodiment, the bucket inclination detector 49 is provided so that it is judged from the detection value of the bucket inclination detector 49 whether or not the wheel loader 1 is in the loading operation, but the judgment may be made in a different manner.

For instance, without using the bucket inclination detector 49, the loading-in-progress flag may be set OFF when the boom-bottom pressure reaches the third judgment value or below. In this case, the third judgment value may be the same as or different from the boom-bottom pressure judgment values 1 and 2 according to the exemplary embodiment.

Alternatively, the loading-in-progress flag may be set OFF upon detection that the bucket lever is shifted toward the damping side by a predetermine amount or more in place of detecting the bucket inclination angle.

The invention claimed is:

1. A wheel loader comprising:

an engine;

working equipment configured to be driven by the engine;

a travel device configured to be driven by the engine;

a detector configured to detect a state of the working equipment and a state of the travel device, the detector comprising at least an accelerator displacement detector configured to detect an accelerator displacement; and a controller configured to store a plurality of torque curves defining different torque characteristics of the engine and to select one of the torque curves for controlling the engine depending on a detection result provided by the detector, the torque curves comprising one excavation torque curve and two or more non-excavation torque curves, the controller comprising:

a state judging unit configured to judge from the detection result provided by the detector whether or not the wheel loader is in an excavation operation and whether or not the wheel loader is in a loading operation; and a torque-curve selector configured to: select the excavation torque curve when the wheel loader is judged to be in the excavation operation; select one of the two or more non-excavation torque curves depending on the accelerator displacement detected by the accelerator displacement detector when the wheel loader is judged to be in the loading operation; and select and fix another one of the two or more non-excavation torque curves with a smallest obtainable torque not depending on the accelerator displacement when the wheel loader is judged to be neither in the excavation operation nor in the loading operation.

2. The wheel loader according to claim 1, wherein the non-excavation torque curves comprise a non-excavation torque curve to be selected when the accelerator displacement detected by the accelerator displacement detector reaches a maximum level, the non-excavation torque curve defining:

torque characteristics identical to torque characteristics of the excavation torque curve in an engine-speed range below an engine speed for the excavation torque curve to have a maximum obtainable torque; and torque characteristics according to which an obtainable torque is small as compared with an obtainable torque in the excavation torque curve at least partially in a range above the engine speed for the excavation torque curve to have the maximum obtainable torque.

3. An engine control method for a wheel loader, the wheel loader comprising:

an engine;

working equipment configured to be driven by the engine;

a travel device configured to be driven by the engine;

a detector configured to detect a state of the working equipment and a state of the travel device; and a storage configured to store a plurality of torque curves defining different torque characteristics of the engine;

the torque curves comprising one excavation torque curve and two or more non-excavation torque curves, the method comprising:

judging from a detection result provided by the detector whether or not the wheel loader is in an excavation operation and whether or not the wheel loader is in a loading operation;

selecting the excavation torque curve when the wheel loader is judged to be in the excavation operation;

detecting an accelerator displacement and selecting one of the non-excavation torque curves depending on the accelerator displacement when the wheel loader is judged to be in the loading operation; and selecting and fixing another one of the two or more non-excavation torque curves with a smallest obtainable torque not depending on the accelerator displacement when the wheel loader is judged to be neither in the excavation operation nor in the loading operation.

* * * * *